July 3, 1962    J. J. GODBEY    3,042,864
ELECTRICAL WAVE ANALYZER
Filed Nov. 28, 1958    4 Sheets-Sheet 1

Attest
Charles F. Steininger

INVENTOR.
Josiah J. Godbey
BY
Attorney

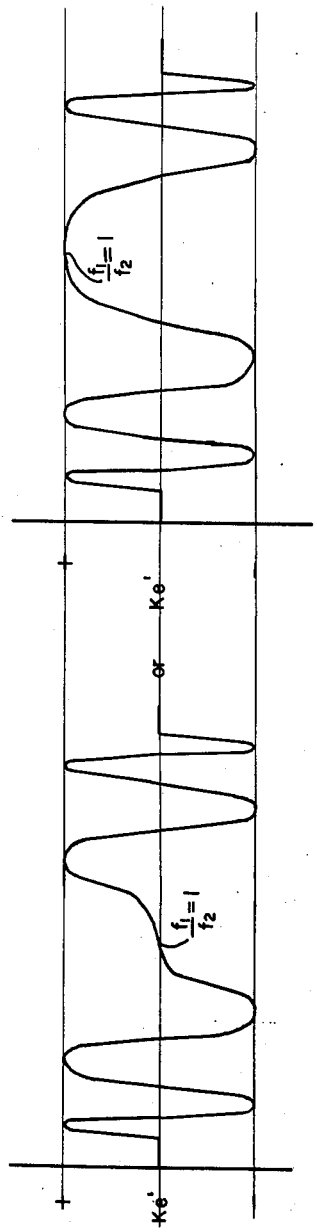
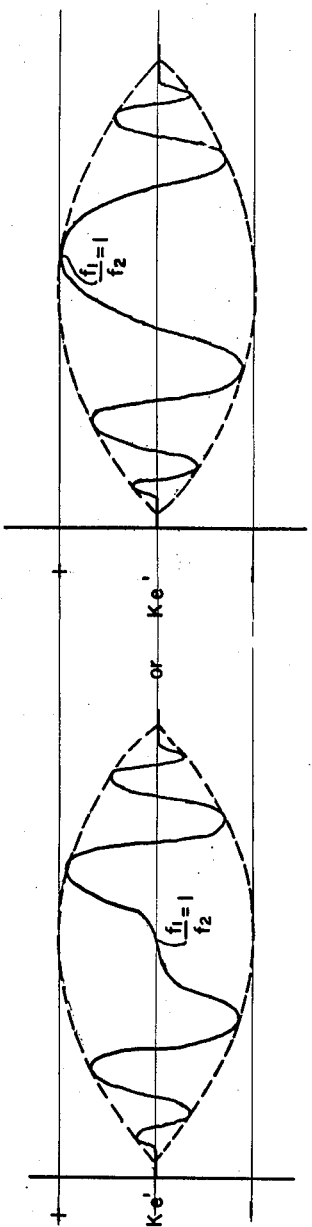

United States Patent Office 3,042,864
Patented July 3, 1962

3,042,864
ELECTRICAL WAVE ANALYZER
Josiah J. Godbey, Richardson, Tex., assignor to The Atlantic Refining Company, Philadelphia, Pa., a corporation of Pennsylvania
Filed Nov. 28, 1958, Ser. No. 776,923
6 Claims. (Cl. 324—77)

The present invention relates to an electrical wave analyzer. More particularly, it relates to apparatus for determining the values of amplitude and frequency of a complex waveform. In a still more specific aspect, it relates to a device for measuring the harmonic distortion of amplifiers or the like.

An electrical wave analyzer is essentially a high frequency-selective linear voltmeter. In use, the wave analyzer is tuned through the frequency spectrum to be analyzed and quantitatively measures the amplitude of discrete signals appearing in the spectrum. Such an instrument is commonly used to determine harmonic distortion components generated by a piece of equipment such as an amplifier. It may also be used to measure the frequency components making up a complex waveform.

The wave analyzers generally available today obtain their selectivity by the use of crystal filters, regenerative circuits or some form of magnetostrictive filter. Because these filters are fixed in frequency, it is necessary to frequency convert the signal to be analyzed to the frequency of the filter. In such circuits, it is necessary to balance out the beat oscillator frequency in a balanced frequency converter. This is a very sensitive balance and is easily upset by normal drift of the oscillator frequency and temperature changes. For these reasons, present-day analyzers of this character are limited to a lower frequency of about 20 cycles per second.

It is therefore an object of the present invention to provide an electrical wave analyzer wherein the frequency converter has no beat oscillator signal and hence requires no balancing circuits.

Still another object of the present invention is to provide an electrical wave analyzer wherein the bandwidth can be as narrow as one desires and which is made up of simple filter components.

Another and further object of the present invention is to provide an electrical wave analyzer capable of working from D.C. through the radio frequency spectrum.

A still further object of the present invention is to provide an electrical wave analyzer whose operation is based upon the principles of the synchronous switch.

Figure 1:
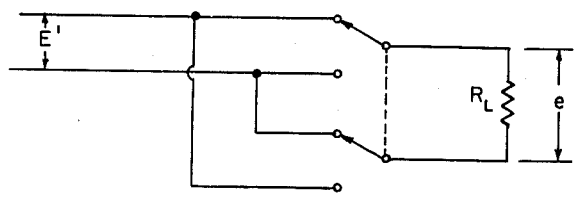
Figure 2:
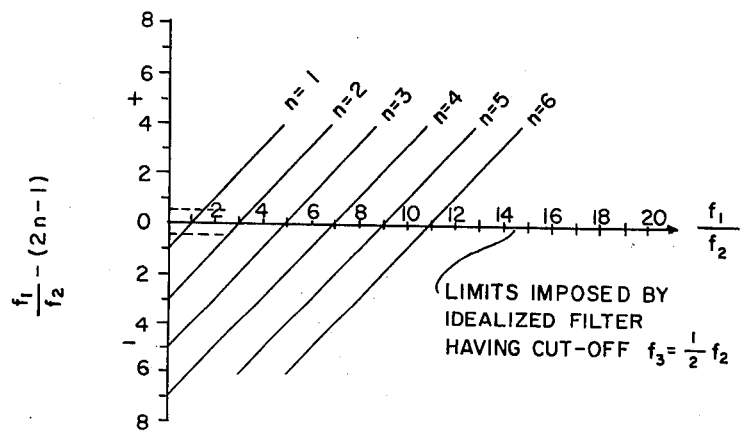
Figure 3:
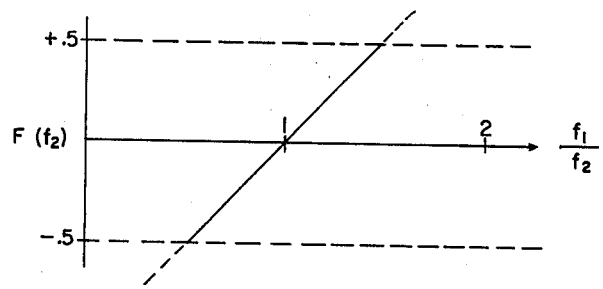
Figure 6:
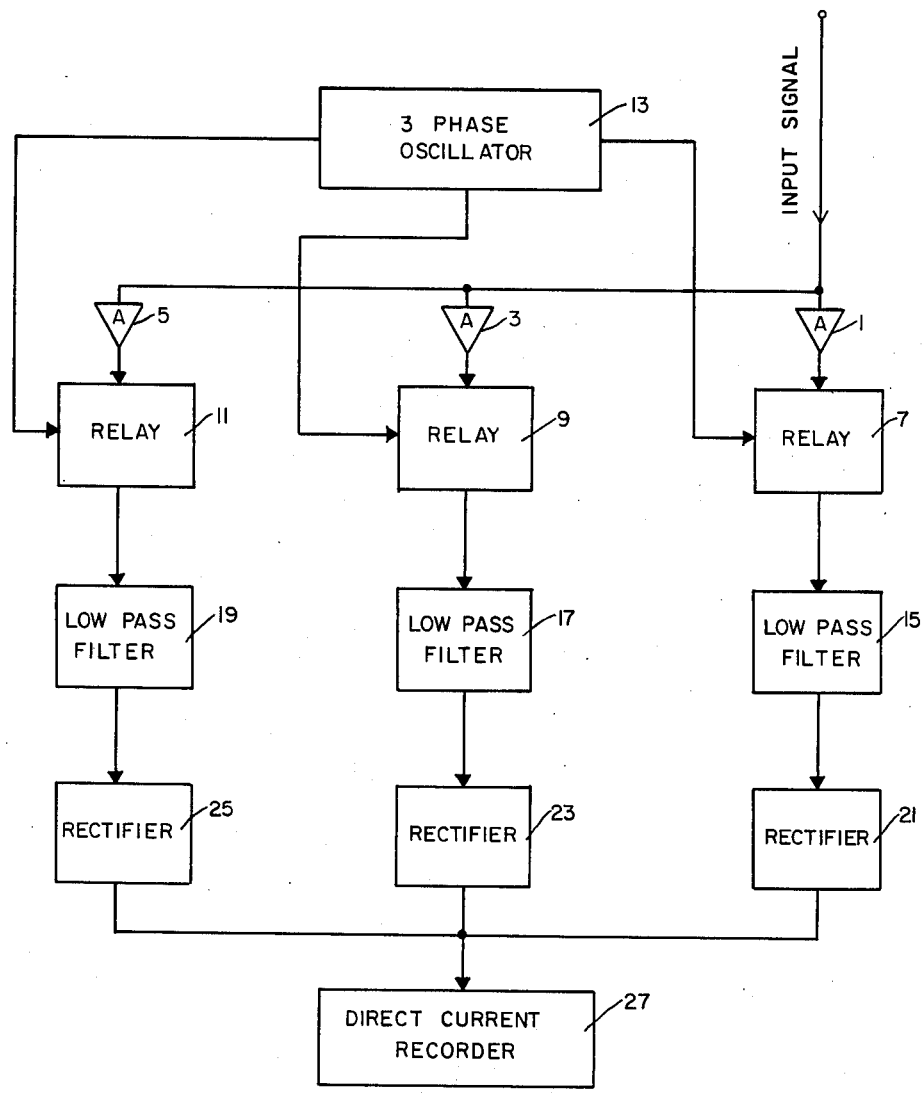
Figure 7:
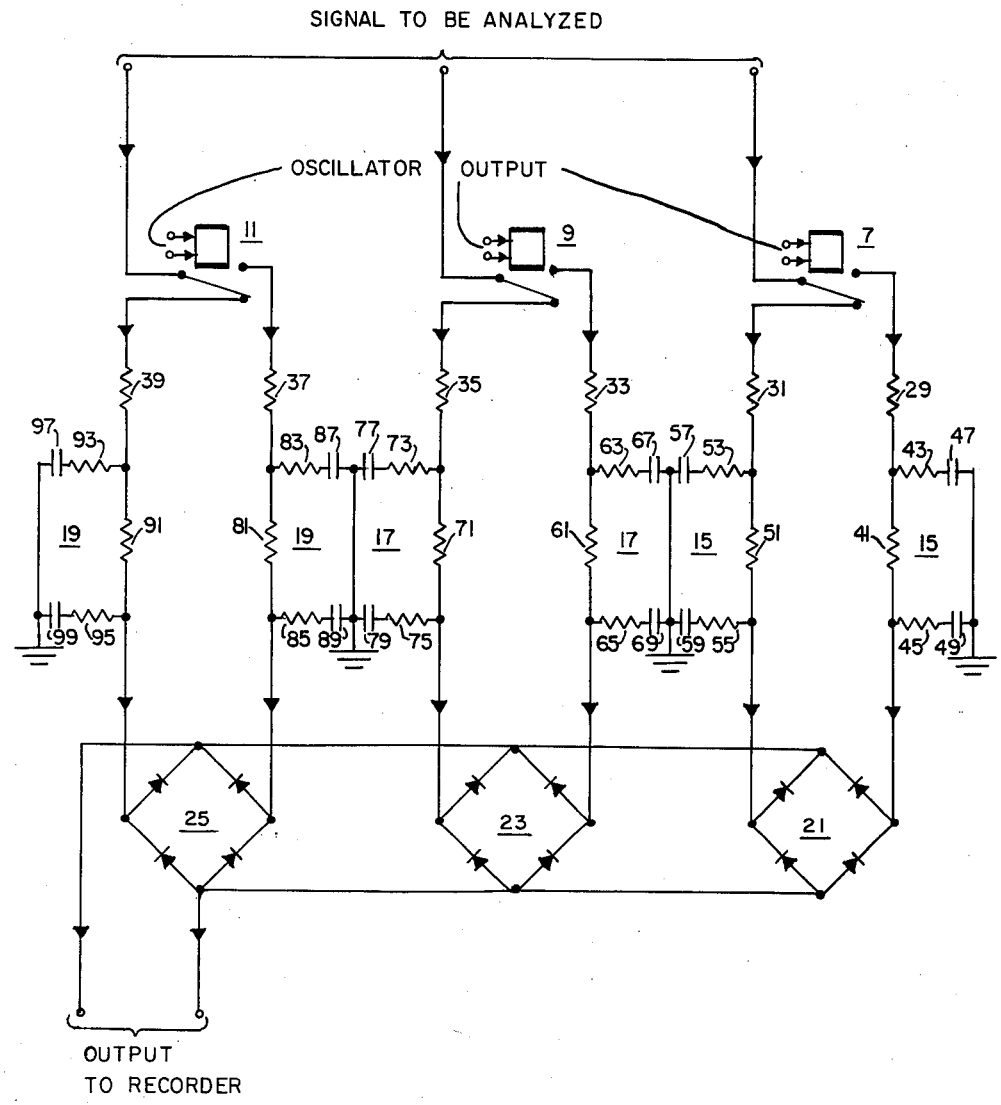

Other and further objects and advantages of the present invention will be apparent from the following detailed descripton when read in conjunction with the drawings wherein:

FIGURE 1 is a diagrammatic sketch of a synchronous switch,

FIGURE 2 is a plot of $f_1/f_2-(2n-1)$ for various values of $n$ for an idealized filter, FIGURE 3 is a section of the plot of FIGURE 2 greatly expanded, FIGURE 4 is a waveform of the output of an idealized filter, FIGURE 5 is a waveform of an output of an actual filter, FIGURE 6 is a block diagram of the basic elements of the preferred form of the present invention, and FIGURE 7 is a simplified schematic circuit diagram of a part of the apparatus of FIGURE 6.

Briefly, in accordance with the present invention, a method and apparatus are provided for the analysis of complex waveforms wherein the wave to be analyzed is fed to at least two synchronous switches and each of the switches is operated over a predetermined range of frequencies and at different phase angles in order to periodically reverse the polarity of the signal to be analyzed in accordance with each phase of the switch operating signal. Thereafter, the output of each synchronous switch is fed to a separate filter means, the output of each filter means is rectified and the rectified signals are combined and passed to an appropriate measuring device.

In order to more clearly understand the present invention, it will be best to first analyze the function of a synchronous switch as a frequency selective device. A simple schematic diagram of a synchronous switch is shown in FIGURE 1 of the drawings.

If we assume that the switch is operated at a rate of $\omega_2$ with equal dwell on each half of its switching cycle, the output voltage $e$ may be represented by the following equation:

$$e = \frac{4}{\pi} E' \sum_{n=1}^{n=\infty} \frac{(-1)^{n-1}}{2n-1} \cos(2n-1)\omega_2 t$$

Where $n$ is an interger.
Now let: $E' = E \cos \omega_1 t$
then:

$$e = \frac{4}{\pi} E \sum_{n=1}^{n=\infty} \frac{(-1)^{n-1}}{2n-1} \cos \omega_1 t \cos(2n-1)\omega_2 t$$

$$e = \frac{4}{\pi} E \sum_{n=1}^{n=\infty} \frac{(-1)^{n-1}}{2n-1} \{\tfrac{1}{2} \cos[\omega_1-(2n-1)\omega_2]t + \tfrac{1}{2} \cos[\omega_1+(2n-1)\omega_2]t\}$$

$$e = \frac{2}{\pi} E \sum_{n=1}^{n=\infty} \frac{(-1)^{n-1}}{2n-1} \{\cos[\omega_1-(2n-1)\omega_2]t + \cos[\omega_1+(2n-1)\omega_2]t\}$$

Now let us filter the above voltage with a filter having a cut-off frequency of $f_3$. If we assume that $\omega_3$ is much smaller than either $\omega_1$ or $\omega_2$, i.e., $\omega_1 \gg \omega_3$, $\omega_3 \ll \omega_2$, with the filtering above, it is apparent the second cosine term is always filtered out. The output then becomes:

$$e' = \frac{2}{\pi} E \sum_{n=1}^{n=\infty} \frac{(-1)^{n-1}}{2n-1} \cos[\omega_1-(2n-1)\omega_2]t$$

or $$Ke' = \cos[\omega_1 t - (2n-1)\omega_2 t]_{n=1}^{n=\infty}$$

where:

$$\frac{1}{K} = \frac{2}{\pi} E \sum_{n=1}^{n=\infty} \frac{(-1)^{n-1}}{2n-1}$$

rewriting:

$$Ke' = \cos 2\pi t[f_1-(2n-1)f_2]_{n=1}^{n=\infty}$$

$$= \cos 2\pi f_2 t\left[\frac{f_1}{f_2}-(2n-1)\right]_{n=1}^{n=\infty}$$

Now, if we plot $f_1/f_2$ against $f_1/f_2-(2n-1)$ for various values of $n$, the operation of this idealized filter will be shown by the plot of FIGURE 2 of the drawings. This plot shows wide excursions for the factor of $f_2$, i.e., $f_1/f_2-(2n-1)$; and, therefore, does not show the effect of the filtering we have imposed. If the filter cut-off frequency, $f_3$, is $\tfrac{1}{2}f_2$, then the excursions of the $f_2$ factor will be limited to the shaded area of the plot. In actual practice the ratio of $f_3/f_2$ will be much less than $\tfrac{1}{2}$.

By expanding the first section of the plot of FIGURE 2 as shown in FIGURE 3 we can see just what is happening. The output of the synchronous switch and filter makes a frequency excursion from ½$f_2$ to O to ½$f_2$ again. In other words, if $f_1$ or $f_2$ is swept in frequency through the point where $f_1/f_2=1$, then the output from the filter will vary from ½$f_2$ to O and back to ½$f_2$.

Through the idealized filter assumed, the output would appear as shown in FIGURE 4 as $f_2$ is slowly swept through $f_1$. In actual practice, however, the filter response curve would have a finite slope at cut-off and the output would appear as in FIGURE 5. The difference between the two output signals is due to the phase relationship of the synchronous switch frequency $f_2$ and the input signal frequency $f_1$. The period between peak excursions of the output wave is determined by the frequency difference between $f_1$ and $f_2$. The amplitude of the excursions is determined by the amplitude of the input voltage E′, the rate that $f_2$ is swept through the passband of the filter, and the passband characteristics of the filter.

It should now be evident that a synchronous switch followed by a low-pass filter can be used as a constant bandwidth, frequency selective device. However, one main disadvantage of such a device is evident by re-examination of FIGURE 5. As $f_2$ sweeps through the frequency $f_1$ the voltage at frequency coincidence, i.e., $f_1=f_2$ may be any value between O and E. As mentioned before, this is caused by the phase relationship of the two signals at coincidence.

It has been found in accordance with the present invention that, in order to utilize the above-described principles of the synchronous switch followed by a low-pass filter to build a reliable and stable wave analyzer, two things must be done. First, the output excursions from the switch and filter combination must be rectified so that the output can be measured by a D.C. meter where a zero meter reading will indicate zero output. Secondly, and most important, two or more switches must be operated at a phase angle relationship to one another. By this process, when the rectified outputs are combined, the output voltage can never be zero at frequency coincidence.

Accordingly, the preferred form of applicant's invention is shown by the block diagram of FIGURE 6. In FIGURE 6 the input signal is first fed to isolation amplifiers 1, 3, and 5. The inputs to these amplifiers are parallel and common gain control elements may be provided as desired. The outputs of amplifiers 1, 3 and 5 are connected to individual relays 7, 9, and 11, respectively. A variable frequency, three-phase oscillator 13 is employed to operate relays 7, 9, and 11 in such a manner that a different phase of the oscillator output signal controls the operation of each relay. Oscillator 13 should also have a frequency range coextensive with the frequency range of the harmonically related sinusoidal components which it is desired to measure. The output signals of each relay are passed to individual low-pass filters 15, 17, and 19 and the outputs of the low-pass filters are connected to individual rectifiers 21, 23, and 25. The outputs of rectifiers 21, 23, and 25 are then connected, either in series or parallel, to D.C. recorder 27 or any other suitable measuring device.

FIGURE 7 is a simplified schematic diagram showing relays 7, 9, and 11, low-pass filters 15, 17, and 19, and rectifiers 21, 23, and 25 of FIGURE 6. In FIGURE 7, the signal to be analyzed is applied to the center arm contact of each of relays 7, 9, and 11. These contacts preferably receive the input signal from isolation amplifiers, as heretofore mentioned. The coils of relays 7, 9, and 11 are each connected to a separate phase of a three-phase oscillator.

Relays 7, 9, and 11 may be any suitable synchronous switch either electrical, mechanical, or electro-mechanical. The form of switch chosen for use in the circuit will depend upon the primary frequency coverage and the simplicity desired. A mechanical switch is generally limited to analyzing the low and very low frequencies. For example, such a switch may be coupled to any mechanical drive of known speed which can provide equal dwell periods for the switch contacts. This may take the form of a motor, a rocker arm system, a vibrator, or the like. The electro-mechanical switch is generally of the relay type. This form may be used to analyze frequencies from the very lowest to several hundred cycles per second. This type analyzer is more practical and versatile than a mechanical unit but is somewhat more complicated. An electrical synchronous switch is by far the most versatile of the three forms. Such a switch can be made to cover a frequency spectrum from the very lowest frequency through the medium of high frequency radio range but is still more complicated than the electro-mechanical. The electrical synchronous switch may be made up of switched vacuum tubes, transistors, or diodes.

The contacts of relays 7, 9, and 11 are connected to pi-type, low-pass filters by means of resistors 29, 31, 33, 35, 37, and 39, respectively. Each of the low-pass filters comprises a series-connected resistor with series-connected resistors and capacitors paralleled to ground. For example, resistors 41, 43, and 45 and capacitors 47 and 49 make up one low-pass filter; a second low-pass filter comprises resistors 51, 53, and 55 and capacitors 57 and 59; a third low-pass filter comprises resistors 61, 63, and 65 and capacitors 67 and 69; a fourth, resistors 71, 73, and 75 and capacitors 77 and 79; the filth, resistors 81, 83, and 85 and capacitors 87 and 89; and the sixth, resistors 91, 93, and 95 and capacitors 97 and 99. The values of the resistors and capacitors used in the low-pass filters should be selected so that the filters will pass a band of frequencies ranging upwardly from D.C. and depending upon the desired band pass of the filters.

The outputs of filters are applied to individual full-wave, bridge-type rectifiers 21, 23, and 25, as hereinbefore mentioned. Rectifiers 21, 23, and 25 may be either conventional half-wave or full-wave circuits utilizing diodes, contact rectifiers or the like. The outputs of rectifiers 21, 23, and 25 are combined and fed to a suitable measuring device.

In operation, it will be obvious to those skilled in the art that the frequency of oscillator 13 will be varied until a maximum D.C. component is indicated by D.C. recorder 27 or any other suitable measuring device. The frequency of oscillator 13 at the point of maximum indication by D.C. recorder 27 will thus represent the frequency of one of the sinusoidal components present in the input signal. The magnitude of the indication by D.C. recorder 27 will also be proportional to the amplitude of that component being measured. Obviously, the frequency of oscillator 13 will be swept through a desired range of frequencies such that all frequency components of the input signal lying in this range of frequencies will be analyzed. It will also be appreciated by those skilled in the art that, by the use of three synchronous switches operating at phases separated by 120°, the D.C. component present at the output of the relays can never be less than 86.6 percent of the possible maximum. It is also apparent that more relays with phase relationships of less than 120° separation would provide an even greater degree of accuracy.

The following tabulation shows the advantage gained by the use of a multiplicity of switches whose full-wave rectified outputs are combined:

| No. of Switches | Phase Angle Between Switches, degrees | Coincidence Output | |
|---|---|---|---|
| | | Minimum | Maximum |
| 1 | | 0 | 1 |
| 2 | 90 | 0.707 | 1 |
| 3 | 120 | 0.866 | 1 |
| 5 | 72 | 0.951 | 1 |
| 6 | 60 | 0.966 | 1 |

The ripple frequency of the combined outputs is determined by the number of switches used, the relationship of the switch drive frequency to the incoming signal frequency, and the speed at which the switch frequency is swept through frequency coincidence. The speed at which the switch frequency may be swept for a given percentage of minimum obtainable output is determined by the time constant of the low-pass filter times the time constant of the output indicator. Should the output indicator be an oscilloscope or other high speed device then only the time constant of the low-pass filter determines the sweep speed.

Having thus described my invention, it is to be understood that such description has been given by way of illustration and example only and not by way of limitation, reference for the latter purpose being had to the appended claims.

I claim:

1. Apparatus for determining the characteristics of an electrical signal comprising a variable frequency source of multiphase alternating current adapted to be varied in accordance with indications of frequencies present in said electrical signal, an input circuit for said electrical signal, plural synchronous switch means equal in number to the number of phases of said multiphase variable frequency source and each of which is connected to said input circuit and is operated by one phase of said multiphase, variable frequency source, said switch means being adapted to periodically reverse the polarity of said electrical signal in accordance with each phase of said multiphase, variable frequency source, filter means connected to the output of each of said switch means, full wave rectifier means connected to the output of said filter means and measuring means connected to the combined outputs of said rectifier means.

2. Apparatus in accordance with claim 1 wherein the switch means are synchronous relays.

3. Apparatus in accordance with claim 1 wherein the filter means are low-pass filters.

4. Apparatus in accordance with claim 1 wherein the measuring means is a direct current measuring means.

5. Apparatus in accordance with claim 1 wherein the multiphase, variable frequency source is a three-phase source.

6. Apparatus in accordance with claim 1 wherein the full wave rectifier means is a bridge rectifier.

References Cited in the file of this patent

UNITED STATES PATENTS

| | | |
|---|---|---|
| 1,889,553 | Keinath et al. | Nov. 29, 1932 |
| 2,462,093 | Grimes | Feb. 22, 1949 |
| 2,484,618 | Fisher | Oct. 11, 1949 |
| 2,522,369 | Guanella | Sept. 12, 1950 |
| 2,556,693 | Houghton | June 12, 1951 |
| 2,562,912 | Hawley | Aug. 7, 1951 |
| 2,584,986 | Clark | Feb. 12, 1952 |
| 2,695,399 | Martin | Nov. 23, 1954 |
| 2,756,376 | Davis et al. | July 24, 1956 |
| 2,773,185 | Fulton | Dec. 4, 1956 |
| 2,829,251 | Patton | Apr. 1, 1958 |
| 2,950,435 | Locher et al. | Aug. 23, 1960 |

FOREIGN PATENTS

| | | |
|---|---|---|
| 304,848 | Switzerland | Apr. 1, 1955 |
| 797,057 | Great Britain | June 25, 1958 |

UNITED STATES PATENT OFFICE
CERTIFICATE OF CORRECTION

Patent No. 3,042,864                                    July 3, 1962

Josiah J. Godbey

It is hereby certified that error appears in the above numbered patent requiring correction and that the said Letters Patent should read as corrected below.

Column 2, line 65, for "he" read -- the --; column 4, line 26, for "filth" read -- fifth --.

Signed and sealed this 20th day of November 1962.

(SEAL)
Attest:

ERNEST W. SWIDER                                  DAVID L. LADD
Attesting Officer                                       Commissioner of Patents